(12) United States Patent
Law et al.

(10) Patent No.: US 7,752,480 B2
(45) Date of Patent: Jul. 6, 2010

(54) SYSTEM AND METHOD FOR SWITCHING DIGITAL CIRCUIT CLOCK NET DRIVER WITHOUT LOSING CLOCK PULSES

(75) Inventors: Jethro C. Law, Austin, TX (US); Kirk Edward Morrow, Round Rock, TX (US); John Cummings Schiff, Round Rock, TX (US); Glen Arthur Wiedemeier, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 11/465,639

(22) Filed: Aug. 18, 2006

(65) Prior Publication Data

US 2008/0046776 A1    Feb. 21, 2008

(51) Int. Cl.
*G06F 1/00* (2006.01)
*G06F 1/04* (2006.01)
*G06F 5/06* (2006.01)

(52) U.S. Cl. .................. 713/501; 713/500; 713/600

(58) Field of Classification Search ................ 713/322, 713/500, 501, 600
See application file for complete search history.

(56) References Cited

U.S. PATENT DOCUMENTS

| | | | | | |
|---|---|---|---|---|---|
| 4,423,383 | A | * | 12/1983 | Svendsen | 327/114 |
| 5,167,031 | A | * | 11/1992 | Watanabe | 713/501 |
| 5,734,877 | A | * | 3/1998 | Ries et al. | 713/500 |
| 6,766,460 | B1 | * | 7/2004 | Evoy et al. | 713/323 |
| 2008/0301606 | A1 | * | 12/2008 | Law et al. | 716/6 |

* cited by examiner

*Primary Examiner*—Mark Connolly
(74) *Attorney, Agent, or Firm*—Van Leeuwen & Van Leewen; Matthew B. Talpis (57) ABSTRACT

A system and method for switching digital circuit clock net driver without losing clock pulses is presented. A device uses glitchless clock selection logic, which includes an edge detector, to select a clock signal to provide to device circuitry based upon the device circuitry's performance requirements. When the rising edges of a first clock signal and a second clock signal align, the edge detector momentarily pulses a clock switch signal, which is used to clock in a clock selection signal to a multiplexer. As a result, when the clock selection signal is high, the device waits until the clock edges are aligned before switching clock signals.

20 Claims, 8 Drawing Sheets

SYSTEM AND METHOD FOR SWITCHING DIGITAL CIRCUIT CLOCK NET DRIVER WITHOUT LOSING CLOCK PULSES

BACKGROUND OF THE INVENTION

1. Technical Field

The present invention relates to a system and method for switching a digital circuit clock net driver without losing clock pulses. More particularly, the present invention relates to a system and method for detecting clock edge alignments in order to select a clock signal from a plurality of clock signals without introducing clock cycle dead time.

2. Description of the Related Art

As technology advancements push digital circuit operating frequencies higher, an increase in power consumption and thus, heat generation, have grown to significant levels. Aggressive processor designs today use higher operating frequencies in order to deliver increased performance. A challenge found with these processor designs, however, is that they require a substantial amount of power and generate a substantial amount of heat. As a result, these designs face problems such as reduced battery life as well as undesirable noise levels from fans that are required to ventilate the processor.

One solution to reduce power consumption is to design a high-speed processor with the ability to control its own clock frequency and supply voltage. This is known as "dynamic voltage scaling," or DVS, a technique that varies the supply voltage and clock frequency based on processor computation load. By this approach, during intervals when the processor demands are low, both frequency and voltage are scaled down. Conversely, during intensive processor computations, frequency and voltage are switched to a maximum level.

One approach to switching clock frequencies is to have multiple clock drivers running at different frequencies that are selected through a glitchless multiplexer. The different clock drivers are driven from the same source phase-locked loop (PLL) where the varying frequencies are achieved by ratioed frequency dividers. It is even possible to have programmable dividers that provide a range of operating frequencies. A challenge found, however, is that changing the frequencies on these dividers can introduce glitches on the clock multiplexer output.

Existing art may use a multiplexer (mux) to prevent clock glitches from reaching device circuitry. The glitchless multiplexer selects between multiple input clock sources and transitions between sources glitchlessly. A challenge found with current glitchless multiplexer designs, however, is that they ensure glitchless operation by removing clock pulses and holding the clock net output stable for an extended period of time before the multiplexer outputs the new clock.

While this may prevent glitches, this solution creates clock cycle "dead time" that presents problems in other areas, such as with dynamic circuits expecting a certain clock period. For example, the state of a given circuit depends on a capacitive charge. If the clock period is too long, the dynamic circuit's capacitive charge is not refreshed and thus, state is lost due to leakage current. As such, when a glitchless multiplexer changes operating frequency, dynamic circuits may be adversely affected by its "dead time."

Existing art attempts to alleviate this issue by using a reference clock to indicate when to change clock signals. The reference clock, however, operates at a lowest common multiple of the clock signals from which are selected. A challenge found with this approach is that possible combinations of clock ratios that may be switched are limited by the frequency of the lowest common multiple clock.

What is needed, therefore, is a system and method that provides clock switching ratio flexibility to dynamically switch clock signals without introducing clock cycle dead time into a device's circuitry.

SUMMARY

It has been discovered that the aforementioned challenges are resolved using a system and method for detecting clock edge alignments in order to select a clock signal from a plurality of clock signals without introducing clock signal dead time. A device uses glitchless clock selection logic to select a clock signal to provide to device circuitry based upon the device circuitry's performance requirements. For example, the glitchless clock selection logic provides a fast clock to the device circuitry during times of high performance requirements, and provides a slower clock to the device circuitry during times of lower performance, power saving requirements.

A device includes a phase lock loop that generates a first clock signal, which the phase lock loop provides to glitchless clock selection logic and a frequency divider. The frequency divider divides the first clock signal down in frequency to create a frequency divided first clock signal. For example, the first clock signal may run at 100 MHz, and the frequency divided first clock signal may run at 50 MHz. The frequency divided first clock signal, along with the first clock signal, feed into the glitchless clock selection logic.

The glitchless clock selection logic receives a clock selection signal from a clock control that instructs the glitchless clock selection logic as to which clock signal to select. In one embodiment, the clock control may reside on a microprocessor included on the device. As those skilled in the art can appreciate, the glitchless clock selection logic is capable of selecting between a plurality of clock signals, such as six different clock signals.

The glitchless clock selection logic uses a phase aligner that aligns the frequency divided first clock signal's clock edges with the first clock signal's clock edges. Once aligned, the glitchless clock selection logic uses an edge detector to detect the simultaneous occurrence of the first clock signal's rising clock edge and the frequency divided first clock signal's rising clock edge (second clock signal). In one embodiment, the edge detector may detect the simultaneous occurrence of the falling clock edges of the first clock signal and the second clock signal.

When the rising edges of the first clock signal and the second clock signal align, the edge detector momentarily pulses a clock switch signal, which connects to a latch's clock input. As such, when the clock switch signal pulses, the latch provides the value of its input, which is the clock selection signal, to its output, which controls a multiplexer. As a result, when the clock selection signal is high, the latch waits until the clock switch signal pulses before raising the multiplexer clock selection signal high.

In turn, the multiplexer uses the multiplexer clock selection signal to select between the first clock signal and the second clock signal. In one embodiment, when the multiplexer clock selection signal is low, the multiplexer passes the first clock signal onto the device's circuitry. Continuing with this embodiment, when the multiplexer clock selection signal is high, the multiplexer passes the second clock signal onto the device's circuitry.

The foregoing is a summary and thus contains, by necessity, simplifications, generalizations, and omissions of detail;

consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
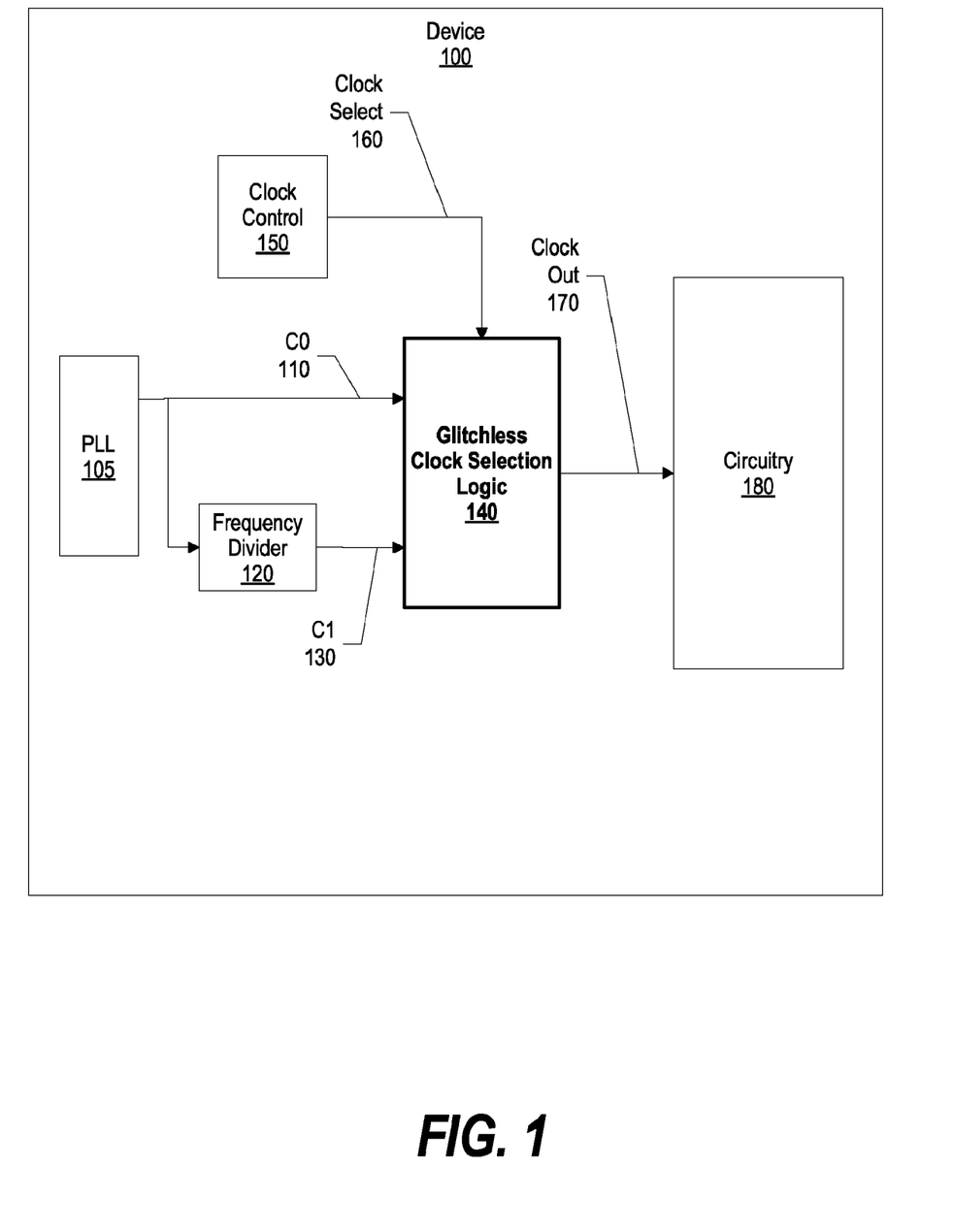
FIG. 1 is a high-level diagram showing a device that includes glitchless clock selection logic for selecting one of a plurality of clock signals to provide to device circuitry.

FIG. 1 is a high-level diagram showing a device that includes glitchless clock selection logic for selecting one of a plurality of clock signals to provide to device circuitry. Device 100 uses glitchless clock selection logic 140 to select a clock signal to provide to circuitry 180 based upon circuitry 180's performance requirements. For example, glitchless clock selection logic 140 provides a fast clock to circuitry 180 during times of high performance requirements, and provides a slower clock to circuitry 180 during times of lower performance, power saving requirements.

Phase lock loop 105 generates a first clock, C0 110, which phase lock loop 105 provides to glitchless clock selection logic 140 and frequency divider 120. Frequency divider 120 divides C0 110 down in frequency to create C1 130. For example, C0 110 may run at 100 MHz, and C1 130 may run at 50 MHz. C1 130, along with C0 110, feed into glitchless clock selection logic 140.

Glitchless clock selection logic 140 receives a clock selection signal (clock select 160) from clock control 150 that instructs glitchless clock selection logic 140 as to which clock signal to select. In one embodiment, clock control 150 may reside on a microprocessor included on device 100. As those skilled in the art can appreciate, glitchless clock selection logic 140 is capable of selecting between more than two clocks as shown in FIG. 1.

Glitchless clock selection logic 140 includes a phase aligner that aligns C1 130's clock edges with C0 110's clock edges. Once aligned, glitchless clock selection logic 140 uses an edge detector to detect the simultaneous occurrence of C0 110's rising clock edge and C1 130's skewed rising clock edge. In one embodiment, the edge detector may detect the simultaneous occurrence of the falling clock edges of C0 110 and C1 130 (see FIG. 7 and corresponding text for further details). The edge detector's output latches in clock select 160's value, which controls a multiplexer that selects between C0 110 and C1 130 (see FIG. 2 and corresponding text for further details). As a result, glitchless clock selection logic 140 provides the selected clock (clock out 170) to circuitry 180.

Figure 2:
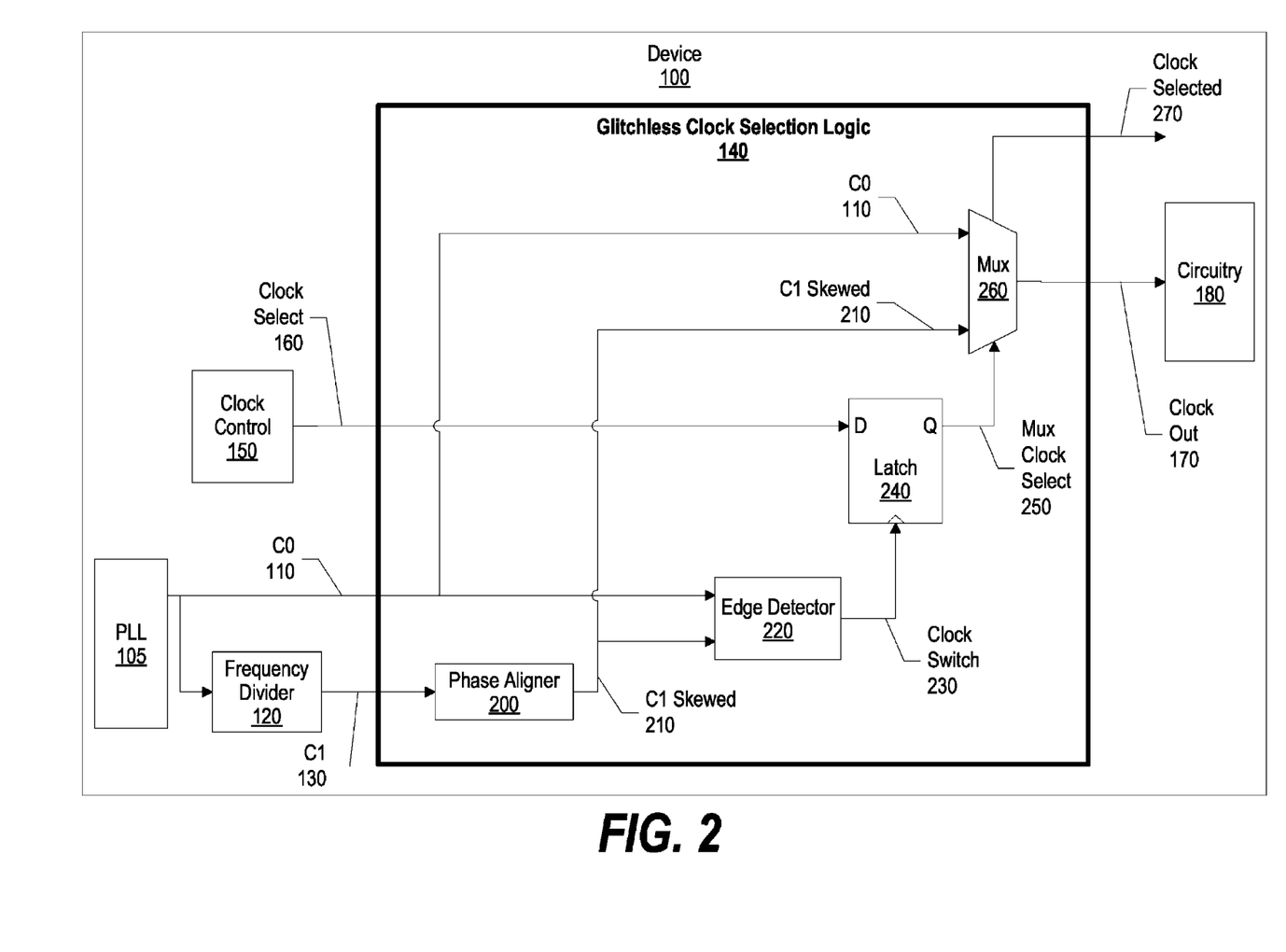
FIG. 2 is a diagram showing components included in glitchless clock selection logic.

FIG. 2 is a diagram showing components included in glitchless clock selection logic. Device 100 includes glitchless clock selection logic 140 that provides one of a plurality of clocks (C0 110 and C1 130) to circuitry 180 without introducing dead time by using edge detection logic (edge detector 220). Device 100, glitchless clock selection logic 140, C0 110, C1 130, and circuitry 180 are the same as that shown in FIG. 1.

Phase lock loop 105 generates C0 110, which operates at a first clock frequency. C0 110 feeds into frequency divider 120, which divides the clock down to a frequency divided first clock signal (C1 130), which operates at a different clock frequency. Due to frequency divider 120's properties, C0 110 and C1 130 may not be phase with each other. Phase aligner 200 compensates for this by shifting the phase of C1 130, which results in a second clock signal (C1 skewed 210), such that C0 skewed 210 become in phase with C0 110. Meaning, C0 110 and C1 skewed 210 are aligned in such a way that their rising or falling edges occur nearly at the same time (see FIG. 3 and corresponding text for further details regarding phase aligner 200).

Edge detector 220 receives C0 110 and C1 skewed 210, and pulses clock switch 230 momentarily when the rising edges of C0 110 and C1 skewed 210 are aligned. As one skilled in the art can appreciate, edge detector 220 may be designed to pulse clock switch 230 when the falling edge of C0 110 and C1 skewed 210 are aligned (see FIG. 4 and corresponding text for further details regarding rising edge detection logic, and see FIG. 7 and corresponding text for further details regarding falling edge detection logic).

Clock switch 230 connects to latch 240's clock input. As such, when clock switch 230 pulses, latch 240 provides the value of its input (D), which is clock select 160, to its output (multiplexer clock select 250). As a result, when clock select 160 is high, latch 240 waits until clock switch 230 pulses before activating multiplexer clock select 250.

Multiplexer 260 uses multiplexer clock select 250 to select between clocks C0 110 or C1 skewed 210. In one embodiment, when multiplexer clock select 250 is low, multiplexer 260 passes C0 110 onto clock output 170, which feeds into circuitry 180. Continuing with this embodiment, when multiplexer clock select 250 is high, multiplexer 260 passes C1 skewed 210 onto clock output 170. Multiplexer 260 also provides clock selected 270 to the logic that initiated the clock switch, thus indicating that the clock switch has occurred.

Figure 3:
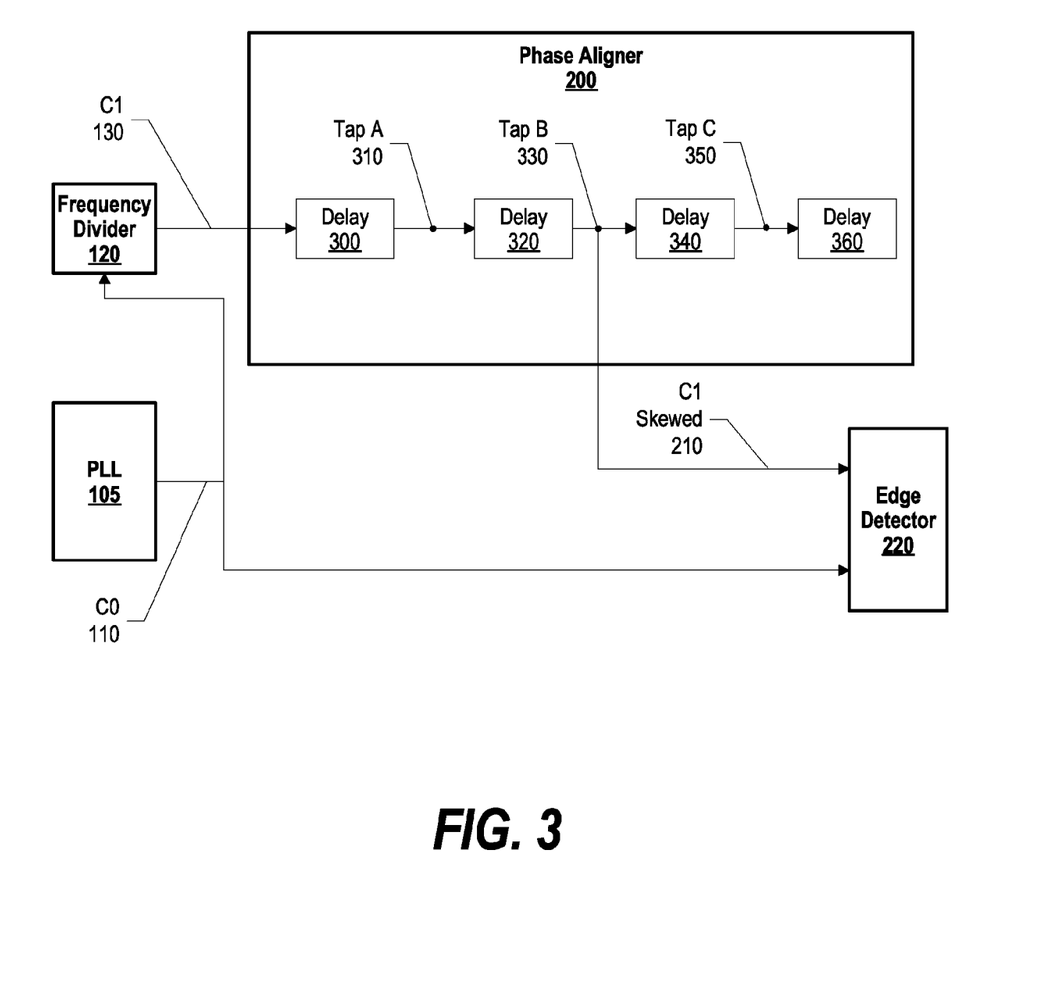
FIG. 3 is a diagram of a phase aligner that delays an incoming clock signal.

FIG. 3 is a diagram of a phase aligner that delays an incoming clock signal. Phase aligner 200 skews incoming clock C1 130 such that its clock edges are in phase with a second clock (C0 110). Phase aligner 200 includes a string of delays (gates), which are delay 300, delay 320, delay 340, and delay 360. At various points between phase aligner 200's delays, a skewed clock may be tapped with preserved polarity but different phase, such as tap A 310, tap B 330, and tap C 350. The example shown in FIG. 3 shows that tap B 330 provides C1 skewed 210 to edge detector 220. In one embodiment, a developer may use simulations to identify the correct tap location such that the two clocks (C0 110 and C1 skewed 210) align at edge detector 220. Frequency divider 120, phase lock loop 105, C1 130, C0 110, phase aligner 200, C1 skewed 210, and edge detector 220 are the same as that shown in FIG. 2.

Figure 4:
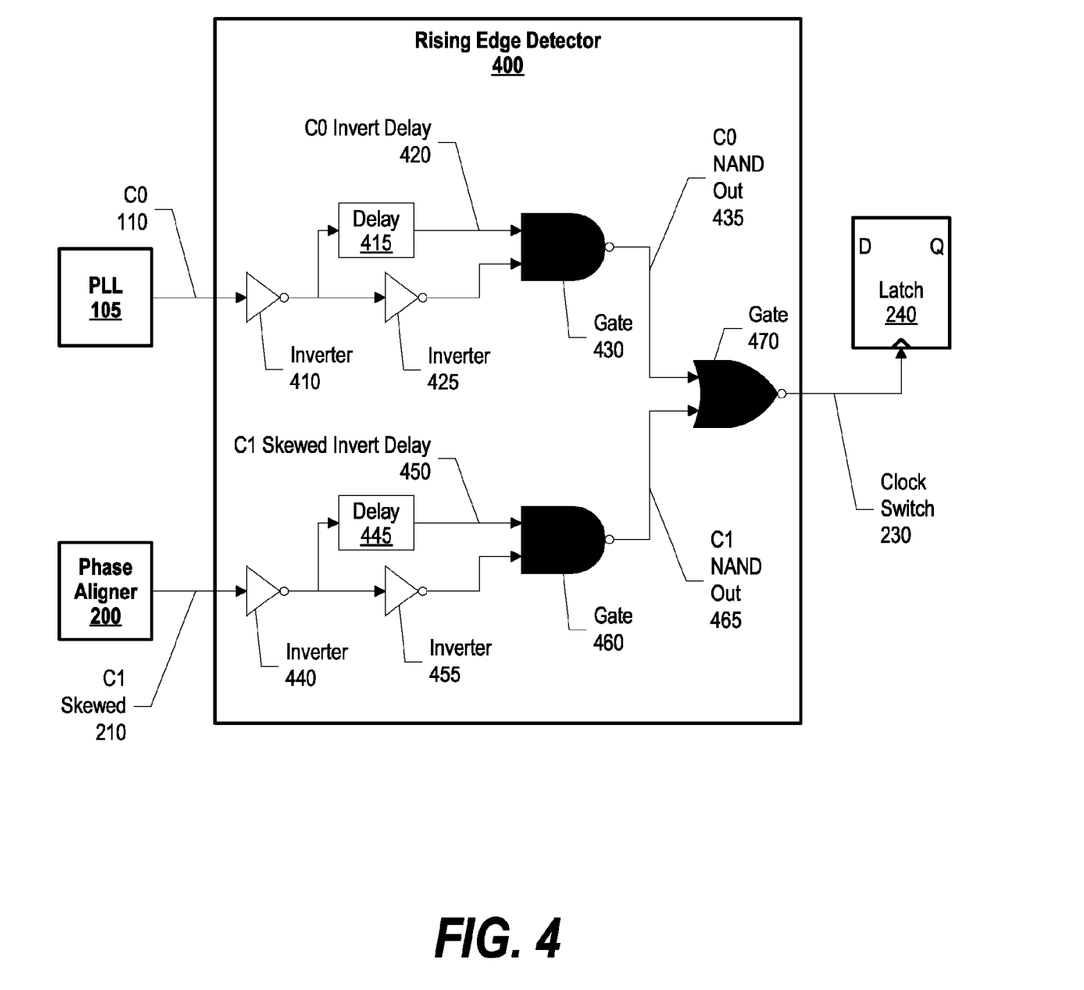
FIG. 4 is a diagram of a rising edge detector that detects when the rising edge of two clock signals align.
Figure 7:
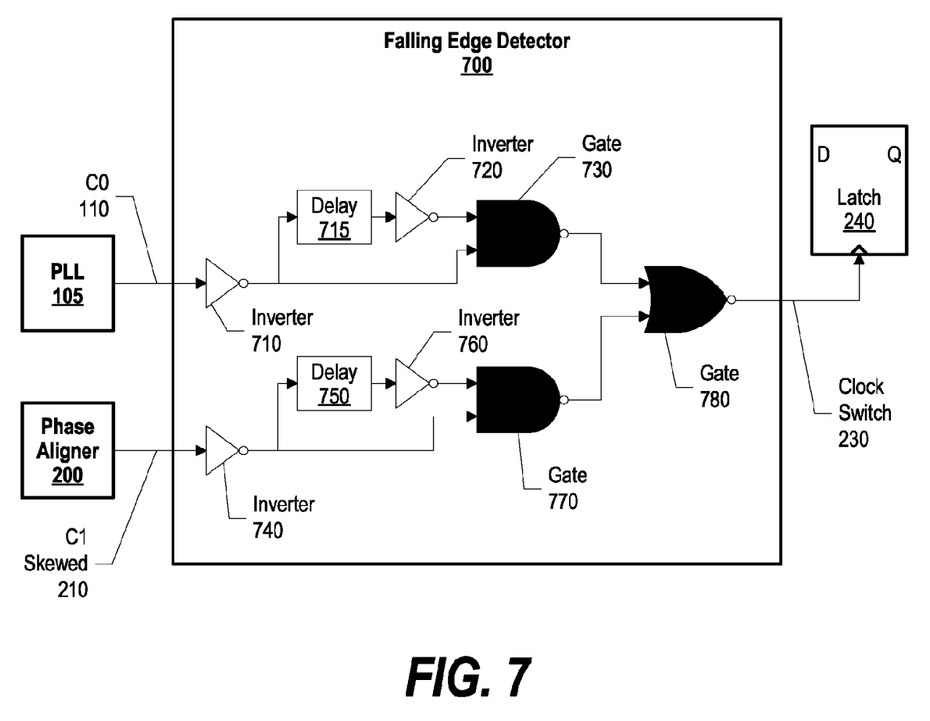
FIG. 7 is a diagram of a falling edge detector that detects when the falling edge of two clock signals align.

FIG. 4 is a diagram of a rising edge detector that detects when the rising edge of two clock signals align. Rising edge detector 400 receives a first clock signal (C0 110) from phase lock loop 105, and receives a second clock signal (C1 skewed 210) from phase aligner 200. When the rising edges of these two clocks align, rising edge detector 400 pulses clock switch 230 momentarily, which clocks latch 240. Phase lock loop 105, C0 110, phase aligner 200, C1 skewed 210, clock switch 230, and latch 240 are the same as that shown in FIG. 2. Rising edge detector 400 may be used for edge detector 220 shown in FIG. 2 when a developer wishes to detect rising clock edge alignments. FIG. 7 includes an example that a developer may use for edge detector 220 when the developer wishes to detect the alignment of falling clock edges.

C0 110 feeds into inverter 410, whose output (inverted first clock signal) feeds into delay 415 and inverter 425. Delay 415 delays inverter 410's output in order for the output of inverter 425 (un-inverted first clock signal) and C0 invert delay 420 (delayed inverted first clock signal) to both be high for a short duration of time. When this occurs, gate 430's output (C0 NAND out 435) is low. The beginning of C0 NAND out 435 becoming low indicates the rising clock edge of C0 110 (see FIG. 5 and corresponding text for further details).

Likewise, C1 skewed 210 feeds into inverter 440, whose output (inverted second clock signal) feeds into delay 445 and inverter 455. Again, delay 445 delays inverter 440's output in order for the output of inverter 455 (un-inverted second clock signal) and C1 skewed invert delay 450 (delayed inverted second clock signal) to both be high for a short duration of time. When this occurs, gate 460's output (C1 NAND out 465) is low. The beginning of C1 NAND out 465 becoming low indicates the rising clock edge of C1 skewed 210 (see FIG. 5 and corresponding text for further details).

When both C0 NAND out 435 and C1 NAND out 465 become low, gate 470's output is high (clock switch 230), signifying that C0 110's and C1 skewed 210's rising edges are aligned. As such, clock switch 230 pulses high and clocks latch 240, which clocks in a new clock select value (see FIG. 2 and corresponding text for further details).

Figure 5:
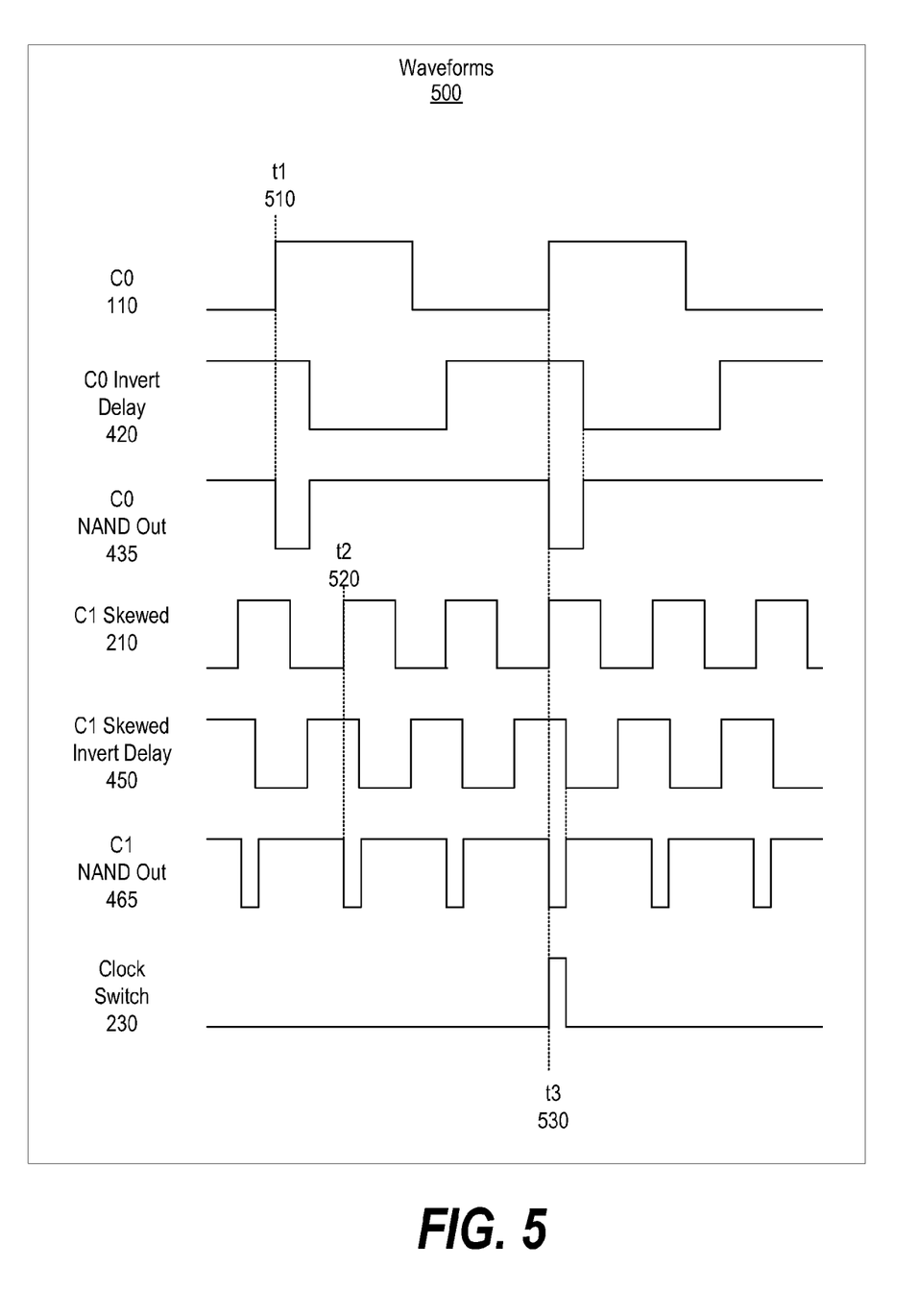
FIG. 5 is a waveform diagrams showing a clock switch signal pulsing when two clock edges align.

FIG. 5 is a waveform diagrams showing a clock switch signal pulsing when two clock edges align. Waveforms 500 include seven signals, all of which are the same as those shown in FIG. 4.

As can be seen, when C0 110 and C1 invert delay 420 are both high, C0 NAND out 435 is low (generated by gate 430 shown in FIG. 4). Waveforms 500 show that at time t1 510, the rising edge of C0 110 corresponds with the falling edge of C0 NAND out 435.

Likewise, when C1 skewed 210 and C1 skewed invert delay 450 are both high, C1 NAND out 465 is low (generated by gate 460 shown in FIG. 4). Waveforms 500 show that at time t2 520, the rising edge of C1 skewed 210 corresponds with the falling edge of C1 NAND out 465.

When both C0 NAND out 435 and C1 NAND out 465 are low, clock switch 230 pulses high (generated by gate 470 shown in FIG. 4). As can be seen at time t3 530, the rising edge of clock switch 230 corresponds with the falling edge of both C0 NAND out 435 and C1 NAND out 465. As such, the rising edge of clock switch 230 corresponds with the rising edge of C0 110 and C1 skewed 210.

Figure 6:
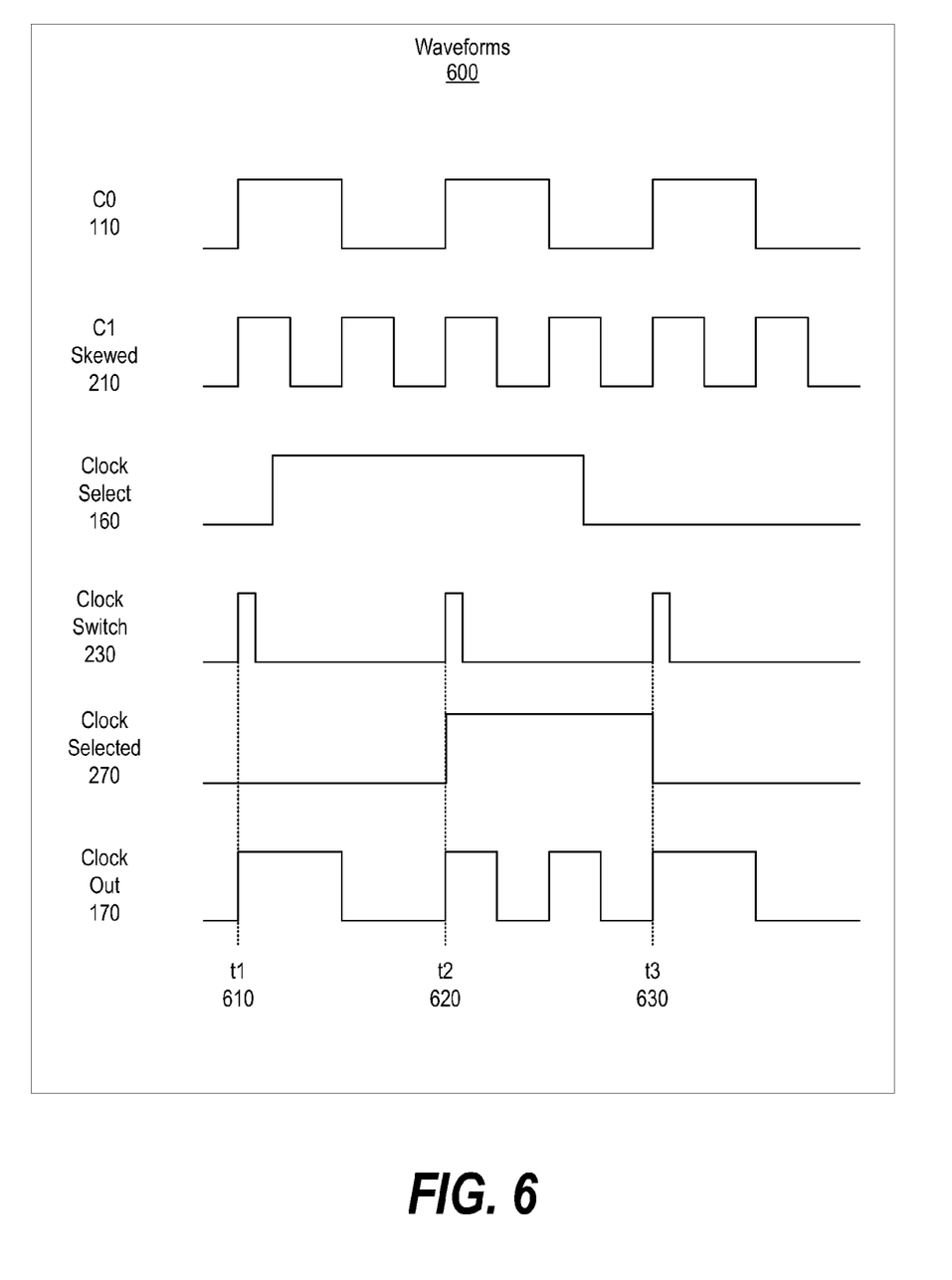
FIG. 6 is a waveform diagram showing a glitchless clock selection logic's output in response to receiving a clock selection signal.

FIG. 6 is a waveform diagram showing a glitchless clock selection logic's output in response to receiving a clock selection signal. Waveforms 600 include six signals, all of which are the same as those shown in FIG. 2. C0 110 and C1 skewed 210 are two clock signals that are selected by a glitchless clock selection logic, such as glitchless clock selection logic 140 shown in FIG. 2. Clock control 150 (shown in FIG. 2) selects either C0 110 or C1 skewed 210 using clock select 160. C0 110 is selected when clock select 160 is low, and C1 skewed 210 is selected when clock select 160 is high.

Clock switch 230 pulses high when C0 110's rising edge and C1 skewed 210's rising edge are aligned (see FIG. 5 and corresponding text for further details). As shown in FIG. 2, latch 240 uses clock select 230 to clock in a new clock select value. Waveforms 600 show that at time t1 610, clock switch 230 pulses high and, since clock select 160 is low, clock out 170 provides C0 110. At time t2 620, clock switch 230 pulses high again. This time, however, clock select 160 is high, which results in C1 skewed 210 provided on clock out 170. Next, at time t3 630, clock switch 230 pulses high and, since clock select 160 is low, clock out 170 reverts back to providing C0 110 to device circuitry.

FIG. 7 is a diagram of a falling edge detector that detects when the falling edge of two clock signals align. FIG. 7 is similar to FIG. 4 with the exception that some of falling edge detector 700's inverters are in different locations than rising edge detector 400's inverters, resulting in clock switch 230 pulsing high when C0 110's falling clock edge and C1 skewed 210's falling clock edge align.

C0 110 feeds into inverter 710, whose output (inverted first clock signal) feeds into delay 715 and gate 730. Delay 715 delays inverter 710's output (delayed inverted first clock signal) in order for inverter 710's output and inverter 720's output (un-inverted delayed first clock signal) to both be high for a short duration of time. When this occurs, gate 730's output is low. Since inverter 710 inverts C0 110, the falling edge of gate 730's output corresponds to the falling edge of C0 110.

Likewise, C1 skewed 210 feeds into inverter 740, whose output (inverted second clock signal) feeds into delay 750 and gate 770. Delay 750 delays inverter 740's output (delayed inverted second clock signal) in order for inverter 740's output and inverter 760's output (un-inverted delayed second clock signal) to both be high for a short duration of time. When this occurs, gate 770's output is low. Since inverter 740 inverts C1 skewed 210, the falling edge of gate 770's output corresponds to the falling edge of C1 skewed 210.

When the outputs of both gate 730 and gate 770 become low, gate 780's output is high (clock switch 230), signifying that C0 110's and C1 skewed 210's falling edges are aligned. As such, clock switch 230 pulses high and clocks latch 240, which clocks in a new clock select value (see FIG. 2 and corresponding text for further details).

Figure 8:
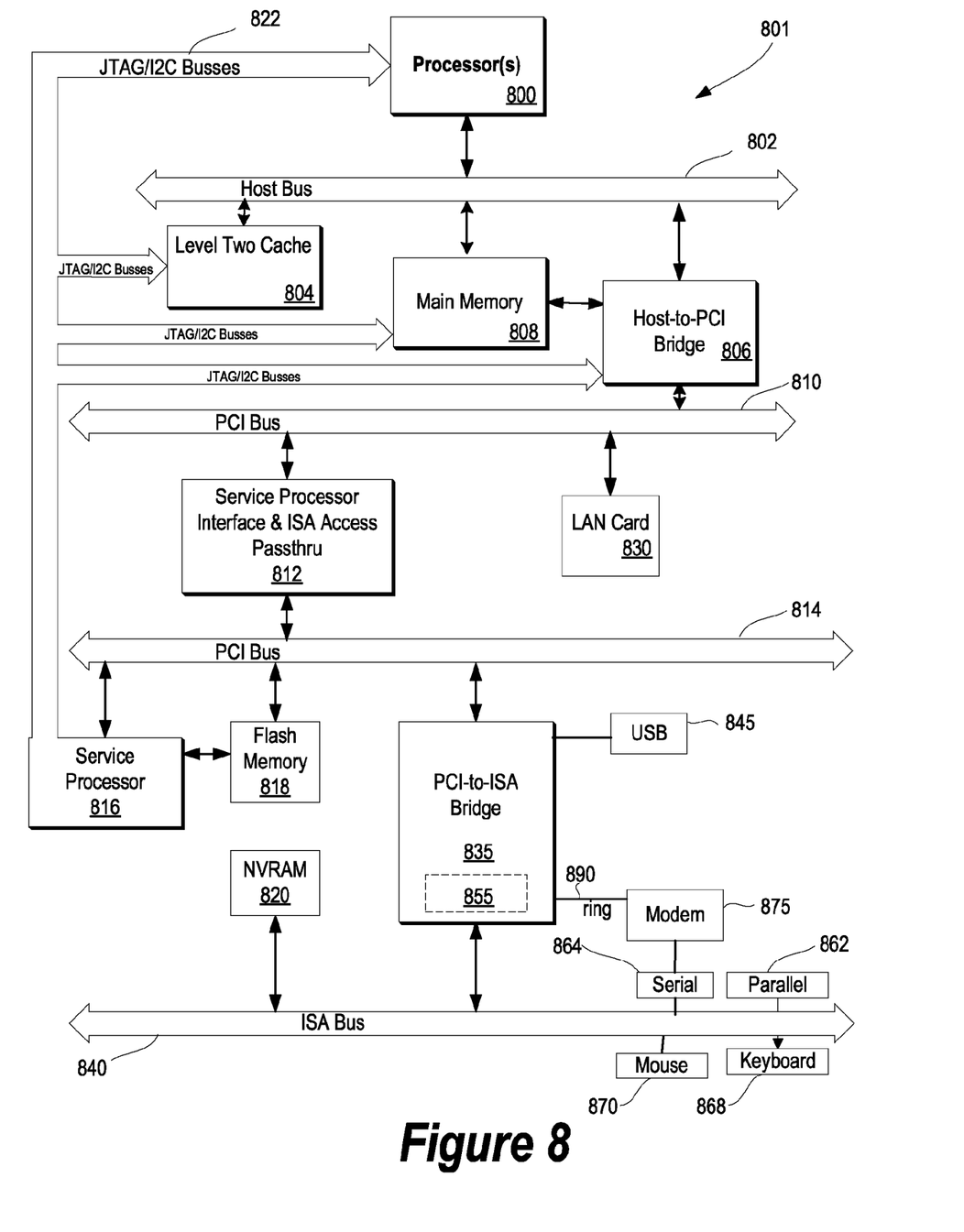
FIG. 8 is an illustration of an information handling system capable of performing the computing operations described herein.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a plurality of clock signals, each of the plurality of clock signals having a different clock frequency;
   receiving a clock selection signal that indicates a change in clock selection from a first clock signal to a second clock signal, the first clock signal and the second clock signal included in the plurality of clock signals;
   detecting, in response to receiving the clock selection signal, that the first clock signal's clock edge aligns with the second clock signal's clock edge, wherein the detecting comprises:
      inverting the first clock signal, resulting in an inverted first clock signal;
      delaying the inverted first clock signal, resulting in a delayed inverted first clock signal;
      inverting the inverted first clock signal, resulting in an un-inverted first clock signal; and
      identifying a first clock timeframe when the un-inverted first clock signal and the delayed inverted first clock signal are both high, the beginning of the first clock timeframe signifying the first clock signal's rising clock edge; and
   selecting the second clock signal in response to the detection of the first clock signal's clock edge aligning with the second clock signal's clock edge.

2. The method of claim 1 further comprising:
   dividing the frequency of the first clock signal, resulting in a frequency divided first clock signal; and
   aligning the phase of the frequency divided first clock signal to the phase of the first clock signal, the phase aligned frequency divided first clock signal being the second clock signal.

3. The method of claim 1 wherein the detecting further comprises:
   inverting the second clock signal, resulting in an inverted second clock signal;
   delaying the inverted second clock signal, resulting in a delayed inverted second clock signal;
   inverting the inverted second clock signal, resulting in an un-inverted second clock signal;
   identifying a second clock timeframe when the un-inverted second clock signal and the delayed inverted second clock signal are both high, the beginning of the second clock timeframe signifying the second clock signal's rising clock edge;
   identifying when the first clock signal's rising clock edge and the second clock signal's rising clock edge are simultaneous; and
   wherein the detecting is performed in response to the identification of when the first clock signal's rising clock edge and the second clock signal's rising clock edge are simultaneous.

4. The method of claim 1 further comprising:
   in response to the detecting, providing the clock selection signal, which results in the selection of the second clock signal.

5. The method of claim 1 further comprising:
   providing the second clock signal to device circuitry; and
   activating a clock selected signal that indicates the selection of the second clock signal.

6. The method of claim 1 wherein the detecting further comprises:
  inverting the second clock signal, resulting in an inverted second clock signal;
  delaying the inverted second clock signal, resulting in a delayed inverted second clock signal;
  inverting the delayed inverted second clock signal, resulting in an un-inverted delayed second clock signal; and
  identifying a second clock timeframe when the un-inverted delayed second clock signal and the inverted second clock signal are both high, the beginning of the second clock timeframe signifying the second clock signal's falling clock edge.

7. The method of claim 6 wherein the detecting further comprises:
  identifying when the first clock signal's falling clock edge and the second clock signal's falling clock edge are simultaneous; and
  wherein the detecting is performed in response to the identification of when the first clock signal's falling clock edge and the second clock signal's falling clock edge are simultaneous.

8. An apparatus comprising glitchless clock selection logic, the glitchless clock selection being effective to:
  receive a plurality of clock signals, each of the plurality of clock signals
  having a different clock frequency;
  receive a clock selection signal that indicates a change in clock selection from a first clock signal to a second clock signal, the first clock signal and the second clock signal included in the plurality of clock signals;
  detect, in response to receiving the clock selection signal, that the first clock signal's clock edge aligns with the second clock signal's clock edge, wherein the detection comprises glitchless clock selection logic that is further effective to:
    invert the first clock signal, resulting in an inverted first clock signal;
    delay the inverted first clock signal, resulting in a delayed inverted first clock signal;
    invert the inverted first clock signal, resulting in an un-inverted first clock signal; and
    identify a first clock timeframe when the un-inverted first clock signal and the delayed inverted first clock signal are both high, the beginning of the first clock timeframe signifying the first clock signal's rising clock edge; and
  select the second clock signal in response to the detection of the first clock signal's clock edge aligning with the second clock signal's clock edge.

9. The apparatus of claim 8 wherein the glitchless clock selection logic is further effective to:
  divide the frequency of the first clock signal, resulting in a frequency divided first clock signal; and
  align the phase of the frequency divided first clock signal to the phase of the first clock signal, the phase aligned frequency divided first clock signal being the second clock signal.

10. The apparatus of claim 8 wherein the glitchless clock selection logic is further effective to:
  invert the second clock signal, resulting in an inverted second clock signal;
  delay the inverted second clock signal, resulting in a delayed inverted second clock signal;
  invert the inverted second clock signal, resulting in an un-inverted second clock signal; and
  identify a second clock timeframe when the un-inverted second clock signal and the delayed inverted second clock signal are both high, the beginning of the second clock timeframe signifying the second clock signal's rising clock edge.

11. The apparatus of claim 10 wherein the glitchless clock selection logic is further effective to:
  identify when the first clock signal's rising clock edge and the second clock signal's rising clock edge are simultaneous; and
  wherein the detecting is performed in response to the identification of when the first clock signal's rising clock edge and the second clock signal's rising clock edge are simultaneous.

12. The apparatus of claim 8 wherein the glitchless clock selection logic is further effective to:
  in response to the detecting, provide the clock selection signal, which results in the selection of the second clock signal.

13. The apparatus of claim 8 wherein the glitchless clock selection logic is further effective to:
  provide the second clock signal to device circuitry; and
  activate a clock selected signal that indicates the selection of the second clock signal.

14. The apparatus of claim 8 wherein the glitchless clock selection logic is further effective to:
  invert the second clock signal, resulting in an inverted second clock signal;
  delay the inverted second clock signal, resulting in a delayed inverted second clock signal;
  invert the delayed inverted second clock signal, resulting in an un-inverted delayed second clock signal;
  identify a second clock timeframe when the un-inverted delayed second clock signal and the inverted second clock signal are both high, the beginning of the second clock timeframe signifying the second clock signal's falling clock edge;
  identify when the first clock signal's falling clock edge and the second clock signal's falling clock edge are simultaneous; and
  wherein the detecting is performed in response to the identification of when the first clock signal's falling clock edge and the second clock signal's falling clock edge are simultaneous.

15. An information handling system comprising:
  one or more processors;
  a memory accessible by the processors;
  one or more nonvolatile storage devices accessible by the processors; and
  a glitchless clock selection tool for selecting a clock signal, the glitchless clock selection tool being effective to:
    receive a plurality of clock signals, each of the plurality of clock signals having a different clock frequency;
    receive a clock selection signal from one of the processors that indicates a change in clock selection from a first clock signal to a second clock signal, the first clock signal and the second clock signal included in the plurality of clock signals;
    detect, in response to receiving the clock selection signal, that the first clock signal's clock edge aligns with the second clock signal's clock edge, wherein the detecting comprises the glitchless clock selection logic tool being further effective to:
      invert the first clock signal using a first inverter, resulting in an inverted first clock signal;
      delay the inverted first clock signal, resulting in a delayed inverted first clock signal;

invert the inverted first clock signal using a second inverter, resulting in an un-inverted first clock signal; and identify a first clock timeframe when the un-inverted first clock signal and the delayed inverted first clock signal are both high, the beginning of the first clock timeframe signifying the first clock signal's rising clock edge; and select the second clock signal in response to the detection of the first clock signal's clock edge aligning with the second clock signal's clock edge.

16. The information handling system of claim 15 wherein the glitchless clock selection logic tool is further effective to:

divide the frequency of the first clock signal using a frequency divider, resulting in a frequency divided first clock signal; and align the phase of the frequency divided first clock signal to the phase of the first clock signal using a phase aligner, the phase aligned frequency divided first clock signal being the second clock signal.

17. The information handling system of claim 15 wherein the glitchless clock selection logic tool is further effective to:

invert the second clock signal using a third inverter, resulting in an inverted second clock signal;

delay the inverted second clock signal, resulting in a delayed inverted second clock signal;

invert the inverted second clock signal using a fourth inverter, resulting in an un-inverted second clock signal;

identify a second clock timeframe when the un-inverted second clock signal and the delayed inverted second clock signal are both high, the beginning of the second clock timeframe signifying the second clock signal's rising clock edge;

identify when the first clock signal's rising clock edge and the second clock signal's rising clock edge are simultaneous; and wherein the detecting is performed in response to the identification of when the first clock signal's rising clock edge and the second clock signal's rising clock edge are simultaneous.

18. The information handling system of claim 15 wherein the glitchless clock selection logic tool is further effective to:

in response to the detection, latch the clock selection signal using a latch; and provide the latched clock selection signal to a multiplexer, which results in the selection of the second clock signal.

19. The information handling system of claim 15 wherein the glitchless clock selection logic tool is further effective to:

invert the second clock signal using a third inverter, resulting in an inverted second clock signal;

delay the inverted second clock signal, resulting in a delayed inverted second clock signal;

invert the delayed inverted second clock signal using a fourth inverter, resulting in an un-inverted delayed second clock signal; and identify a second clock timeframe when the un-inverted delayed second clock signal and the inverted second clock signal are both high, the beginning of the second clock timeframe signifying the second clock signal's falling clock edge.

20. The information handling system of claim 19 wherein the glitchless clock selection logic tool is further effective to:

identify when the first clock signal's falling clock edge and the second clock signal's falling clock edge are simultaneous; and wherein the detecting is performed in response to the identification of when the first clock signal's falling clock edge and the second clock signal's falling clock edge are simultaneous.

* * * * *